United States Patent
Hong

[19]

[11] Patent Number: 5,932,122

[45] Date of Patent: Aug. 3, 1999

[54] PROCESS FOR DETECTING THE INITIAL WELDING POINT OF A WELDING ROBOT

[75] Inventor: Sung-Jin Hong, Suwon, Rep. of Korea

[73] Assignee: Samsung Electronics Co., Ltd., Rep. of Korea

[21] Appl. No.: 08/996,543

[22] Filed: Dec. 23, 1997

[30] Foreign Application Priority Data

May 13, 1997 [KR] Rep. of Korea ............... 97-18528

[51] Int. Cl.$^6$ ........................................... B23K 9/12
[52] U.S. Cl. ............................... 219/124.34; 901/42
[58] Field of Search ........................ 219/124.34, 125.1, 219/137 R; 901/42, 9

[56] References Cited

U.S. PATENT DOCUMENTS 4,761,596  8/1988  Nio et al. ..................................... 901/9

FOREIGN PATENT DOCUMENTS 59-178181  10/1984  Japan ................................. 219/137 R

*Primary Examiner*—Clifford C. Shaw

*Attorney, Agent, or Firm*—Dilworth & Barrese

[57] ABSTRACT

A method for detecting an initial welding point of a welding robot regardless of any irregularity of a parent metal to be welded and the displacement thereof caused by fastening the parent metal. The method includes identifying a first directional vector oriented toward a virtual point given at a weld end part of a roughly taught welding start point and, identifying a second directional vector indicating a direction of a torch which is oriented toward a weld part and bisects an angle included between welding surfaces of the parent metal. Horizontal and vertical tracking directions are coincided with the direction of the second directional vector are determined when the second vector rotates in a positive(+) and negative(−) direction about the first directional vector, respectively. The torch is moved in the determined horizontal and vertical tracking directions until weld deposition occurs, and after weld deposition, the torch is moved to the determined positions on the basis of operation parameters. The torch is then moved in a direction opposite to a welding proceeding direction on the basis of the determined operation parameters and tracking the end of the parent metal. If the weld deposition occurs at an end of the parent metal, the torch is moved in the welding proceeding direction to return the torch to the initial welding point.

9 Claims, 4 Drawing Sheets

PROCESS FOR DETECTING THE INITIAL WELDING POINT OF A WELDING ROBOT

BACKGROUND OF THE INVENTION

1. Field of the Invention

The present invention relates to a welding robot, and in particular to a process for detecting an initial welding point of the welding robot.

2. Description of the Related Art

In welding operations in an automated production line, due to the irregularity and/or displacement of an object to be welded, it is very difficult to precisely detect the initial welding point, even though the welding robot constantly moves along a predetermined path. This is due to the fact that although the positions of welding robots are always constantly maintained by fixing jigs and frames in automated production lines of factories, it is very difficult to precisely position objects to be welded within assigned working spaces on a conveyor or a positioner carrying those objects. Furthermore, certain objects can deviate from size standards, although the deviation may be minute.

In order to solve these problems, a process for detecting the initial welding point through touch sensor tracking has been developed. Touch sensor tracking is a process for precisely finding the position of an object by identifying whether electric current flows between a welding wire or nozzle and the object, while the welding arc is not produced and prior to practical welding. Though the parent metal and the welding wire are ordinarily separated from each other, the initial welding point can be detected by recognizing the point where the two parts become short-circuited, while the welding torch is gradually moved.

Examples of commercially available systems developed using the above principal are FANAC, DAIDEN, ABB, and IGMC. In these systems, a drive source for the touch sensor is mounted outside, so that the touch sensor touches four or five reference points for precise positioning even when the parent metal is either tilted or inverted.

More precise positioning can be accomplished through more touch times. However, as the touching cycles are increased, the touching period is increased, and thus the reduction of the required welding time, which is a very serious factor in mass welding process, is adversely affected.

SUMMARY OF THE INVENTION

It is an object of the present invention to provide a method for precisely detecting the initial welding point of a welding robot regardless of the irregularity of an object to be welded and the displacement thereof caused by fastening it. Through the use of only two touches, the prior art problems involved in increasing the touching period or determining the initial welding point are solved.

In order to achieve the above object, there is provided a method for detecting the initial welding point, having the steps of identifying a first directional vector which is oriented toward a virtual point given at a weld end part of a roughly taught or user estimated welding start point; identifying a second directional vector indicating the direction of the torch which is oriented toward a part to be welded and bisects an angle included between welding surfaces of the parent metal; determining horizontal and vertical tracking directions to be coincided with the direction of the second directional vector when the second vector rotates in a positive(+) and negative(−) direction about the first directional vector, respectively; moving the torch in the determined horizontal and vertical tracking directions until weld deposition occurs, and after weld deposition, moving the torch to the determined positions on the basis of operation parameters; moving the torch in a direction opposite to a welding proceeding direction to an extent determined on the basis of operation parameters and tracking one end of the parent metal; and if the weld deposition occurs at the end of the parent metal, moving the torch in the welding proceeding direction to a predetermined extent to return the torch to the initial welding point.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF PREFERRED EMBODIMENTS

Figure 1:
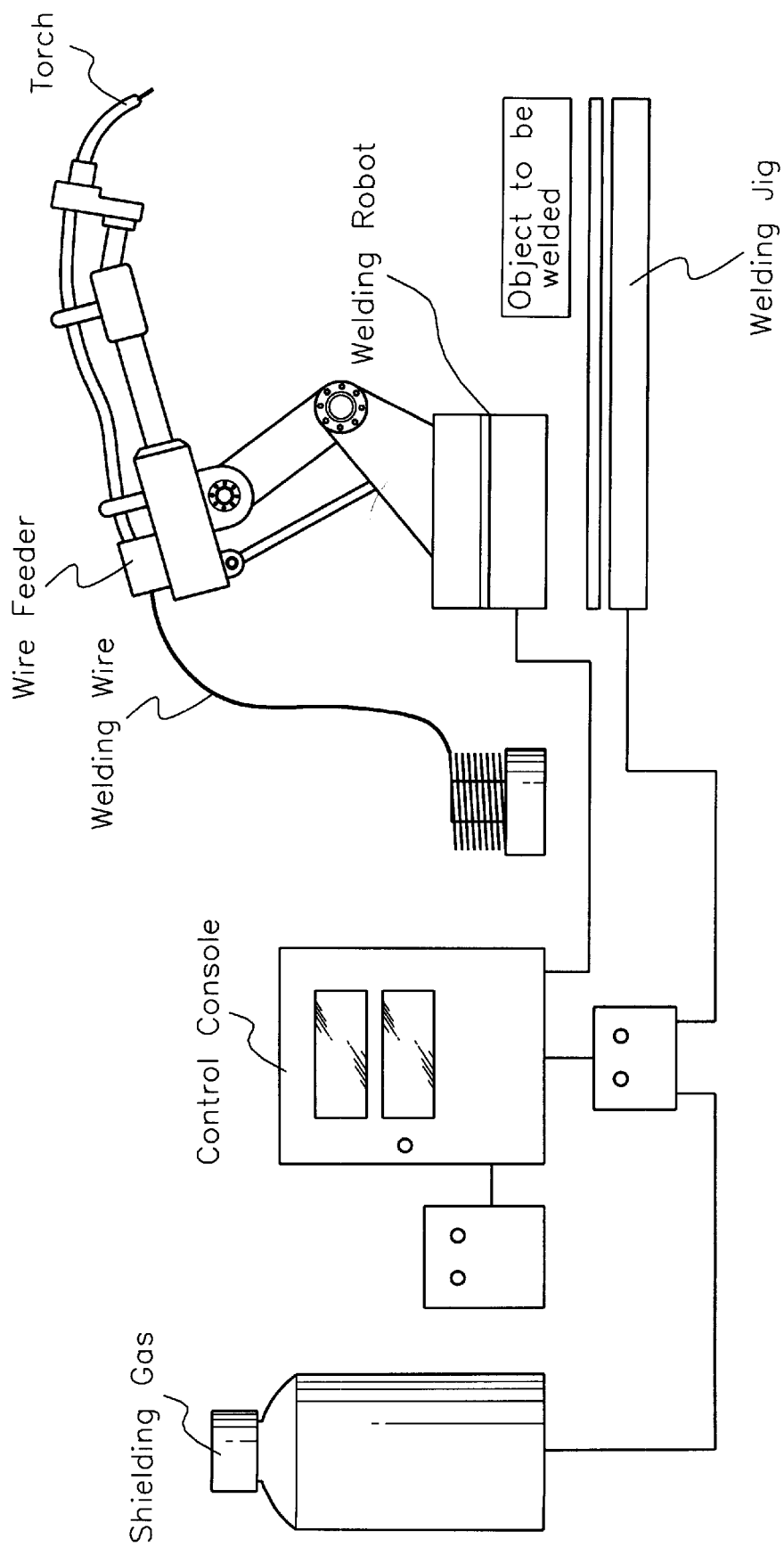
FIG. 1 is a plan view of a welding system.

Referring to FIG. 1 a welding system, includes a shielding gas vessel, a welding robot, a welding machine, a welding wire, a wire feeder, a torch, a welding jig, etc.

With the above construction, if a parent metal to be welded is mounted on the welding jig, the robot first detects the welding start point, and then strong electric current and voltage are generated between the welding wire being fed to the torch and the parent metal to be welded at the detected point to produce an arc. At that time, as the wire fed to the torch is melted, the welding is performed.

In this welding operation, the initial welding point is detected by monitoring whether or not the parent metal to be welded comes into electrical contact with the welding wire or nozzle using the arm of the welding robot, prior to producing the arc. Specifically, although the two parts are ordinarily separated from each other, the initial welding point can be detected by recognizing the point where the two parts become short-circuited, while the welding torch is gradually moved.

Now, the inventive method for detecting the initial welding point of the robot will be explained.

Figure 2:
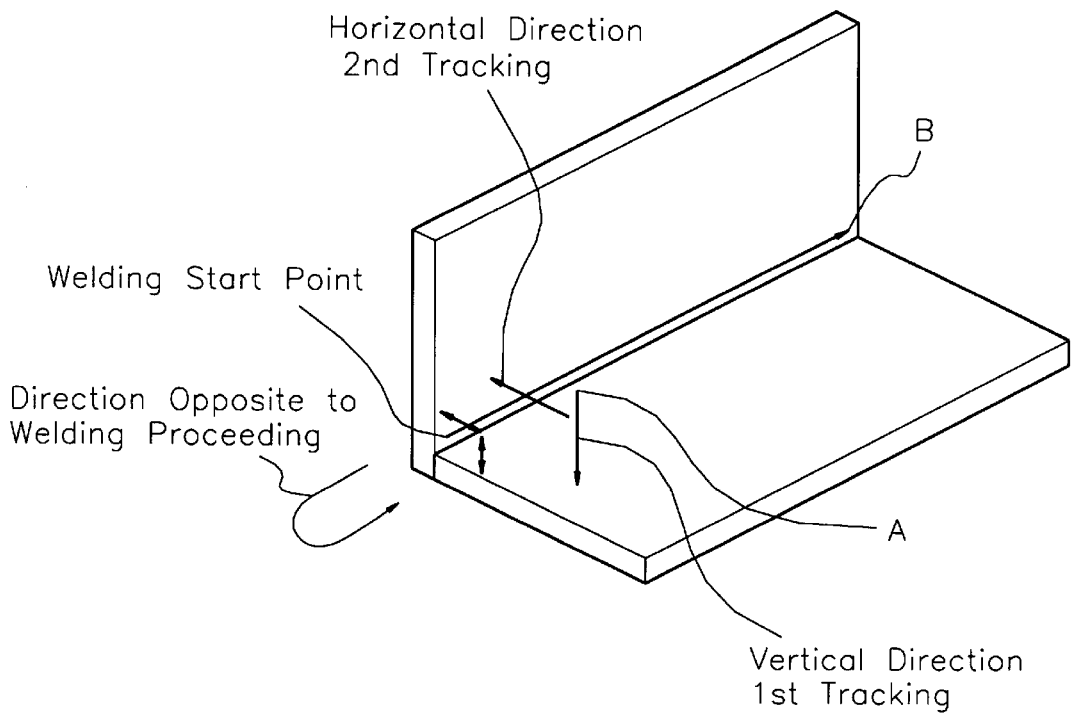
FIG. 2 is a perspective view illustrating the method for detecting an initial welding point of an "L" shaped parent metal in accordance with an embodiment of the present invention.
Figure 3:
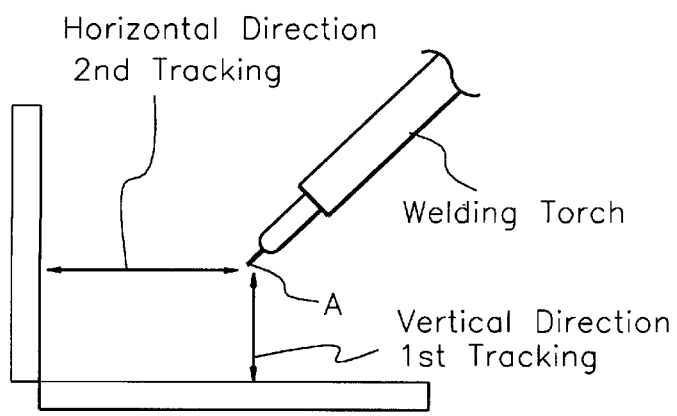
FIG. 3 is a front plan view of the method depicted in FIG. 2.

First, if the L shaped parent metal to be welded as shown in FIGS. 2 and 3 was mounted on the welding jig and a welding start point A was roughly taught by the user, the torch is positioned on the welding start point A. And, if the user roughly taught a welding end point or virtual point B on the welding end zone, the robot determines the welding proceeding direction from the welding start point A to the virtual point B and identifies it as the first directional vector.

Furthermore, the robot identifies the direction of the torch which is oriented toward the welding part and practically bisects the angle included between the surfaces to be welded as the second directional vector.

Then, if the second directional vector was rotated in the negative (−) direction relative to the first identified directional vector, the robot performs tracking of the torch toward the rotated direction (i.e., first tracking). In other words, the torch moves in the direction vertical to the horizontal surface to be welded until a first welding deposition is produced (i.e., first touch), and then moves to a position determined on the basis of operation parameters. If the second directional vector was rotated in the positive (+) direction relative to the first identified directional vector, the robot performs tracking of the torch toward the rotated direction (i.e., second tracking). In other words, the torch moves in the direction vertical to the vertical surface, (i.e. in the horizontal direction to be welded until a second welding deposition is produced (second touch)), and then moves to a position determined on the basis of a second operation parameter.

Thereafter, if the movement to the direction determined on the basis of operation parameters is completed, the torch will move in the direction opposite to the welding proceeding direction and performs the tracking of an end portion of the parent metal (i.e., third tracking). If welding deposition is produced on the end portion (i.e., third touch), the torch will move in the welding proceeding direction a predetermined amount. The resulting position will be the initial welding point.

When the directional vector between the welding start point and the welding end point, which is required to find the initial welding point, is rotated about 30°, there will be no problem in tracking the welding start point. This is due to the fact that although the directional vector between the welding start point and the welding end point is important in fine tuning, the finally found welding start point will be offset within 5 mm from the reference welding line.

Figure 4:
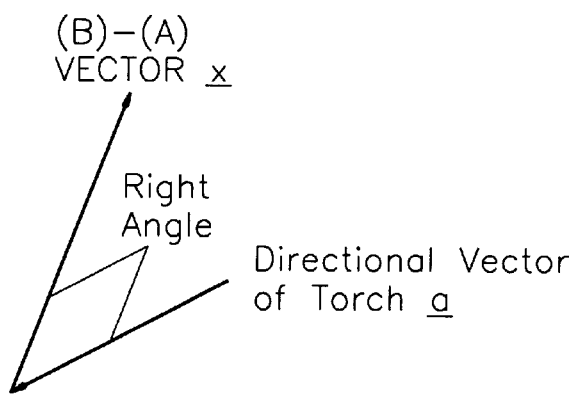
FIG. 4 is a graphical representation of two directional vectors for the torch and the welding process of FIG. 2.
Figure 5:
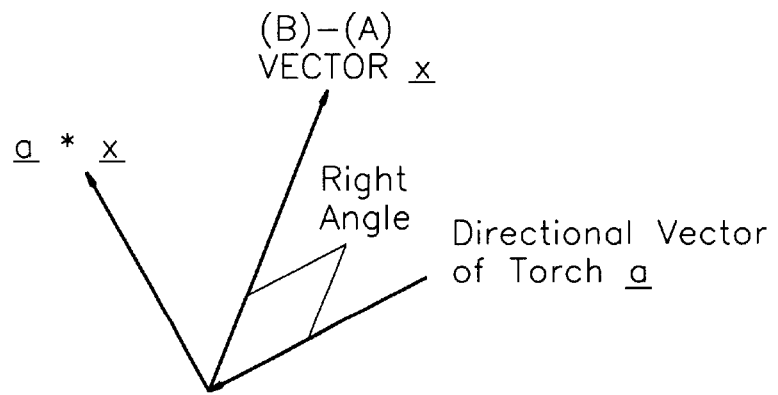
FIG. 5 is a graphical representation of a third directional vector which is obtained from the two directional vectors of FIG. 4.

FIG. 4 shows the directional vectors of torch and welding proceeding directions in the parent metal shown in FIG. 2, and FIG. 5 shows a third directional vector $\underline{a} * \underline{x}$ which is obtained from the vectors shown in FIG. 4, (i.e., from the directional vector $\underline{X}$ from a roughly taught point to a virtual point and the directional vector $\underline{a}$ of the torch).

Figure 6:
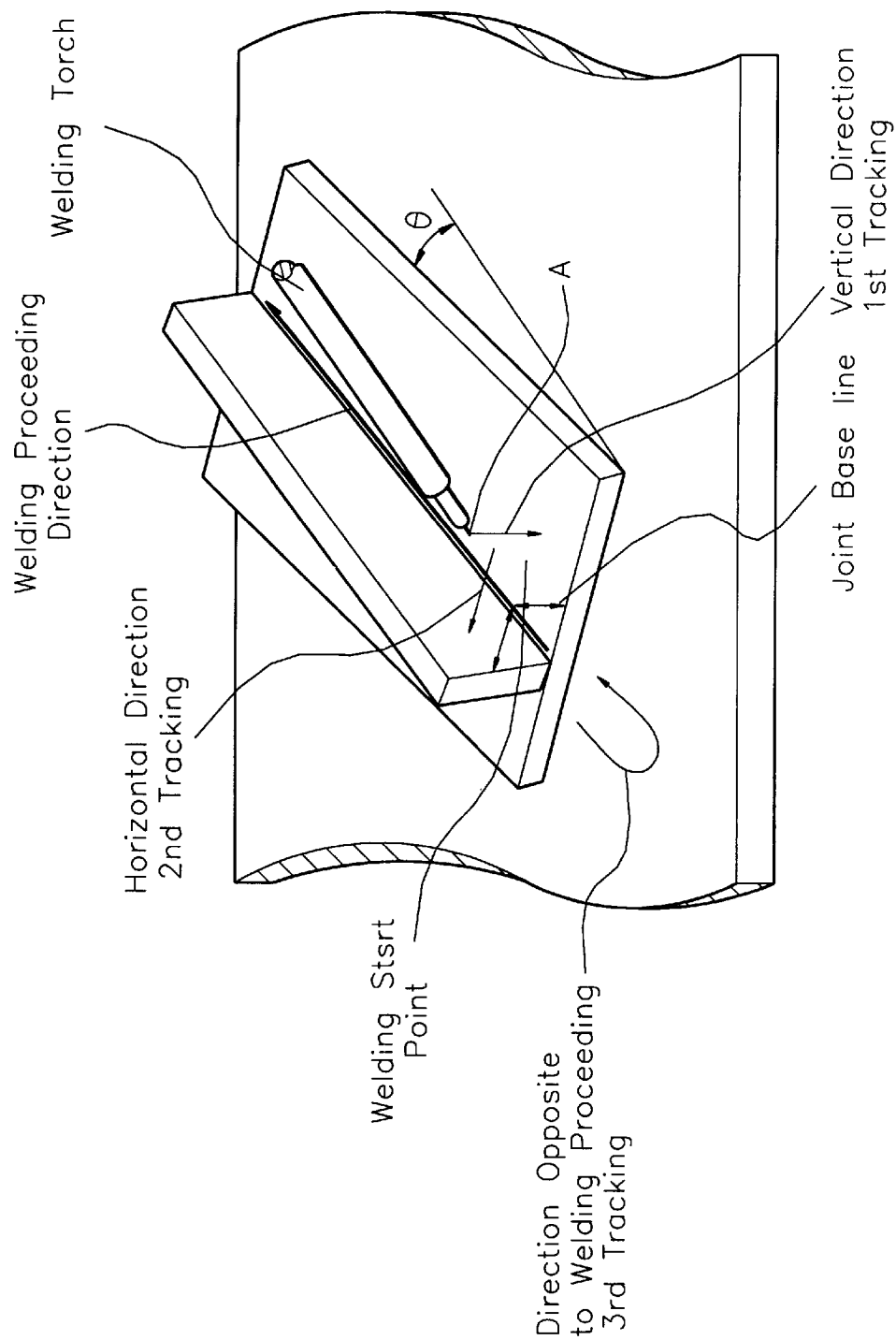
FIG. 6 is a perspective view illustrating the method for detecting the initial welding point of a "T" shaped parent metal, in which the vertical member and the base member are displaced from their predetermined positions.

FIG. 6 illustrates the inventive method for detecting the initial welding point in a "T" shaped parent metal, in which the vertical member is displaced from its predetermined position and a base member is inclined to an angle θ from the horizontal position. When the parent metal of this type is mounted on a welding jig, the user roughly teaches a welding start point and the torch is moved to the center portion of the inclined angle $\underline{\theta}$. Thereafter, the torch performs touch sensor tracking in accordance with the following programmed instruction:

TST ˆ{#End-point},{parent metal type=4},{lateral angle transform}, {proceeding angle transform}, {offset in the welding part}

In the above instruction, "End-point" means a virtual point taught by the user, the value of "parent metal type" becomes 1 in a two-dimensional detection, 2 in a three-dimensional detection, 3 in a determination of torch direction, and 4 in a user defined type. In a local position that the normal vector of the parent metal coincides with a Z coordinate of robot, the parent metal type is 1,2,3. In FIG. 4, an optional direction is detected and thus the parent metal type is 4. Furthermore, if the type of parent metal is 4, the values of "{lateral angle transform}, and {offset in the welding part}" are not required. However, it is sufficient if the teaching of the welding start point is correctly performed at least within an error of 20%. Additionally, since a line passing the welding start point and the welding end point which are taught by the user forms a significant directional vector indicating the position of the parent metal, it is required to teach those points somewhat correctly.

When the instruction for sensor tracking is programmed as explained in the above, the robot will identify the welding proceeding direction from a roughly taught welding start point A' to the end point B' as the first directional vector. Furthermore, the robot identifies the directional vector of the torch which is oriented toward the weld zone and bisects the angle included between the welded surfaces as the second directional vector. Then, if the second directional vector was rotated in the negative (−) direction relative to the first identified directional vector, the robot performs tracking of the torch toward the rotated direction (i.e., first tracking). In other words, the torch moves in the direction vertical to the horizontal surface to be welded until a first welding deposition is produced (i.e., first touch), and then moves to a position determined on the basis of operation parameters. If the second directional vector was rotated in the positive (+) direction relative to the first identified directional vector, the robot performs tracking of the torch toward the rotated direction (i.e., second tracking). In other words, the torch moves in the direction vertical to the vertical surface, (i.e., in the horizontal direction until a second welding deposition is produced (second touch)), and then moves to a position determined on the basis of the operation parameters. Thereafter, if the movement to the direction determined on the basis of the determined operation parameters is completed, the torch will move in the direction opposite to the welding proceeding direction and performs the tracking of an end portion of the parent metal (i.e., third tracking). If welding deposition is produced on the end portion (i.e. at the third touch), the torch will move in the welding proceeding direction by a predetermined amount to the initial welding point.

When the parent metal to be welded has a shape such as L, T, V, etc., as described above, since the present invention always deals with the base member of parent metal as if it is firmly contacted to the horizontal support surface thereof, it is possible to detect the initial welding point through only two touches, even when the base member is either tiled or inverted.

In practice, the welding explained in the above has many applications including welding method lines in excavator or boom manufacturing, shipbuilding, and other heavy industry fields.

According to the present invention, since it is possible to precisely detect the initial welding point through only two touches even though the parent metal to be welded is either tilted or inverted, the automation of the welding method becomes very easy and the time required in mass welding can be reduced.

While the present invention has been described and illustrated herein with reference to the preferred embodiment thereof, it will be understood by those skilled in the art that various changes in form and details may be made therein without departing from the spirit and scope of the invention.

What is claimed is:

1. A method for detecting an initial welding point of a welding robot comprising the steps of:

identifying a first directional vector oriented toward a virtual point at an end of a weld part;

identifying a second directional vector indicating a direction of a torch oriented toward the weld part and bisecting an angle between welding surfaces of a parent metal;

determining horizontal and vertical tracking directions corresponding with the direction of said second directional vector when said second vector rotates in a positive (+) and negative (−) direction, respectively, about said first directional vector;

moving said torch in the determined horizontal and vertical tracking directions until weld deposition occurs;

moving said torch in a direction opposite a welding proceeding direction; and moving said torch said weld proceeding direction to return said torch to the initial welding point.

2. The method according to claim 1, wherein the virtual point is estimated by a user.

3. The method according to claim 1, wherein said step of moving said torch in horizontal and vertical tracking directions further comprises the step of moving said torch to said determined directions in response to operating parameters.

4. The method according to claim 1, wherein the amount said torch is moved in said step of moving said torch in a direction opposite a welding proceeding direction is determined in response to operating parameters.

5. The method according to claim 4, wherein said step of moving said torch in a direction opposite a welding proceeding direction further comprises the step of tracking an end of the parent metal.

6. The method according to claim 1, wherein said step of moving said torch in said weld proceeding direction is performed when weld deposition occurs at an end of said parent metal.

7. A method for detecting an initial welding point of a welding robot comprising the steps of:

identifying a first directional vector oriented toward a virtual point at an end of a weld part;

identifying a second directional vector indicating a direction of a torch oriented toward the weld part and bisecting an angle between welding surfaces of a parent metal;

determining horizontal and vertical tracking directions corresponding with the direction of said second directional vector when said second vector rotates in a positive (+) and negative (−) direction, respectively, about said first directional vector;

moving said torch in the determined horizontal and vertical tracking directions until weld deposition occurs; and moving said torch in a direction opposite a welding proceeding direction.

8. The method according to claim 7, further comprising the steps of:

moving said torch in said weld proceeding direction to return said torch to the initial welding point after weld deposition occurs.

9. The method according to claim 7, wherein said step of moving said torch in a direction opposite a welding proceeding direction further comprises the step of tracking an end of the parent metal.

* * * * *